(12) United States Patent
Eick et al.

(10) Patent No.: US 12,007,515 B2
(45) Date of Patent: *Jun. 11, 2024

(54) OPTIMAL SURVEY DESIGN

(71) Applicant: ConocoPhillips Company, Houston, TX (US)

(72) Inventors: Peter M. Eick, San Antonio, TX (US); Joel D. Brewer, Sealy, TX (US)

(73) Assignee: CONOCOPHILLIPS COMPANY, Houston, TX (US)

(*) Notice: Subject to any disclaimer, the term of this patent is extended or adjusted under 35 U.S.C. 154(b) by 97 days.

This patent is subject to a terminal disclaimer.

(21) Appl. No.: 17/666,078

(22) Filed: Feb. 7, 2022

(65) Prior Publication Data

US 2022/0163690 A1 May 26, 2022

Related U.S. Application Data

(63) Continuation of application No. 16/255,593, filed on Jan. 23, 2019, now Pat. No. 11,243,317, which is a
(Continued)

(51) Int. Cl.
*G01V 1/28* (2006.01)
*G01V 1/00* (2006.01)
(Continued)

(52) U.S. Cl.
CPC ............. *G01V 1/28* (2013.01); *G01V 1/003* (2013.01); *G01V 1/32* (2013.01); *G01V 1/3808* (2013.01);
(Continued)

(58) Field of Classification Search
CPC ........ G01V 1/28; G01V 1/003; G01V 1/3808; G01V 2210/44
See application file for complete search history.

(56) References Cited

U.S. PATENT DOCUMENTS 5,572,483 A 11/1996 Chambers et al.
6,021,379 A 2/2000 Duren et al.
(Continued)

FOREIGN PATENT DOCUMENTS

EP 3341759 B1 * 12/2021 ............. G01V 1/003
WO WO-2015011160 A1 1/2015

OTHER PUBLICATIONS

International Search Report for App. No. PCT/US2016/049056 dated Dec. 1, 2016 (2 pages).
(Continued)

*Primary Examiner* — Isam A Alsomiri
*Assistant Examiner* — Vikas Atmakuri
(74) *Attorney, Agent, or Firm* — Polsinelli PC

(57) ABSTRACT

Methods and systems of analyzing and optimizing a seismic survey design are described. A system includes a plurality of seismic receivers disposed in a survey area at a plurality of receiver locations. The system also includes a plurality of seismic sources disposed in the survey area at a plurality of source locations. The plurality of receiver locations and the plurality of source locations are specified by a seismic survey design minimizing any artifacts identified in a filtered spectrum obtained by applying a frequency-wavenumber filter to a central midpoint space summation. The plurality of receiver locations and the plurality of source locations are determined based on a comparison of the filtered spectrum to a second filtered spectrum. The second filtered spectrum is for a second central midpoint space summation.

20 Claims, 10 Drawing Sheets

Related U.S. Application Data continuation of application No. 15/248,911, filed on Aug. 26, 2016, now Pat. No. 10,228,475.

(60) Provisional application No. 62/210,270, filed on Aug. 26, 2015.

(51) Int. Cl.
  *G01V 1/32* (2006.01)
  *G01V 1/38* (2006.01)

(52) U.S. Cl.
  CPC ...... *G01V 2200/14* (2013.01); *G01V 2210/16* (2013.01); *G01V 2210/44* (2013.01)

(56) References Cited

U.S. PATENT DOCUMENTS

| | | | |
|---|---|---|---|
| 6,049,759 | A | 4/2000 | Etgen |
| 6,343,256 | B1 | 1/2002 | Winbow et al. |
| 6,446,008 | B1 * | 9/2002 | Ozbek ............ G01V 1/364 367/45 |
| 6,665,618 | B1 | 12/2003 | Thomas et al. |
| 6,778,909 | B1 | 8/2004 | Popovici et al. |
| 7,660,674 | B2 | 2/2010 | Magill et al. |
| 9,541,659 | B2 * | 1/2017 | Vassallo ............ G01V 1/362 |
| 10,228,475 | B2 | 3/2019 | Eick et al. |
| 2003/0187583 | A1 | 10/2003 | Martin et al. |
| 2009/0204330 | A1 | 8/2009 | Thomsen et al. |
| 2010/0014381 | A1 | 1/2010 | Beasley et al. |
| 2010/0118650 | A1 | 5/2010 | Eick et al. |
| 2011/0178712 | A1 | 7/2011 | Aaron et al. |
| 2013/0223187 | A1 | 8/2013 | Thapar et al. |

OTHER PUBLICATIONS

Lavely, E., "3-D Seismic Survey Design for Optimal Resolution", 67th Annu. Seg Int. Mtg. (Dallas, Nov. 2-7, 1997) Expanded Abstr. Biogr., vol. 1, Issue 1, Jan. 1997.

Meunier, Julien, "Design of land 3-D surveys for stratigraphic purposes", SEG Abstracts, vol. 60, Jan. 1990.

\* cited by examiner

OPTIMAL SURVEY DESIGN

CROSS-REFERENCE TO RELATED APPLICATIONS

This application is a continuation of U.S. application Ser. No. 16/255,593 filed Jan. 23, 2019 and entitled "OPTIMAL SURVEY DESIGN," which is a continuation of U.S. application Ser. No. 15/248,911, filed Aug. 26, 2016 and entitled "OPTIMAL SURVEY DESIGN," which claims benefit to U.S. Provisional Application Ser. No. 62/210,270, filed Aug. 26, 2015 and entitled "OPTIMAL SURVEY DESIGN." Each of these applications is incorporated in its entirety herein.

FIELD

The disclosure relates to seismic exploration and processing, and more specifically to determining the seismic data quality for a plurality of locations in a given seismic survey.

BACKGROUND

Seismic surveying has become the primary tool of exploration companies in the continental United States, both onshore and offshore. Seismic surveying consists of three separate stages: data acquisition, data processing and data interpretation. The success of a seismic prospecting operation depends on satisfactory completion of all three stages.

A seismic survey is conducted by creating an impulsive or vibratory wave—a seismic wave—on or near the surface of the ground along a predetermined line, using an energy source. The seismic wave travels into the earth, is reflected by subsurface formations, and returns to the surface, where it receivers called geophones—similar to microphones—detect the signal and the data recorded. By analyzing the time it takes for the seismic waves to reflect off of subsurface formations and return to the surface, a geophysicist can map subsurface formations and anomalies and predict where oil or gas may be trapped in sufficient quantities for exploration and development activities.

Until relatively recently, seismic surveys were conducted along a single line on the ground, and their analysis created a two-dimensional picture akin to a slice through the earth, showing the subsurface geology along that line. This is referred to as two-dimensional or 2D seismic data.

Currently, almost all oil and gas exploratory wells are preceded by 3D seismic surveys. The basic method of testing is the same as for 2D, but instead of a single line of energy source points and receiver points, the source points and receiver points are laid out in a grid across the property. The receiver points are generally laid down in parallel lines (receiver lines), and the source points are generally laid out in parallel lines that are approximately perpendicular to the receiver lines in most modern surveys, although variations in layout are used.

The spacing of the source and receiver points is determined by the design and objectives of the survey. They may be several hundred feet apart or as close as 55 feet or even smaller for high-resolution surveys. The resulting recorded reflections received at each receiver point come from all directions, and sophisticated computer programs can analyze this data to create a three-dimensional image of the subsurface. After the data is processed, scientists and engineers assemble and interpret the 3D seismic information in the form of a 3D data cube that represents a display of subsurface features.

The area covered by the 3D grid must be larger than the subsurface area to be imaged, in order to acquire sufficient data for the area of interest. Generally, in order to acquire "full-fold data" for an area, source and receiver points must be laid out to half the spread length beyond the boundary of the area of interest build fold and be full fold at the edge of the area of interest. The additional data acquired in this "halo" on the outer edge of a 3D survey is sometimes called "tails." The quality of the subsurface data at the edge of the survey will not ordinarily be sufficient to map and evaluate the subsurface of these "tail" areas.

Additionally, an area around the zone of interest must be added to properly migrate the data and image it correctly. This zone is called the migration apron or aperture and it is at generally greater then about 60% of the depth to the primary objective. Thus, even though the area of interest is small, three zones must be filled—the original area of interest, the migration apron necessary for the processer to image the zone of interest and finally the fold taper that the acquisitions group needs to acquire useable signal to noise ratio data for the processor to migrate into the zone of interest.

Seismic data is generally processed for the purpose of imaging seismic reflections for structural and stratigraphic interpretation. The quality of the seismic data that is ultimately used in the structural and stratigraphic interpretation depends on many different factors and varies from survey to survey. Steps that are omitted or not correctly completed in the data acquisition, data processing and data interpretation stages can greatly affect the quality of the final images or numerical representation of the subsurface features. The quality of the seismic data directly affects the reliability of observations and numerical measurements made from the seismic data and affects any decisions based on the seismic data.

Constructing accurate seismic images and corresponding earth models is important in making business or operational decisions relating to oil and gas exploration and reservoir management. For example, earth scientists use seismic images to determine where to place wells in subterranean regions containing hydrocarbon reservoirs. They also build models of the subsurface to create reservoir models suitable for reservoir fluid flow modeling. The quality of the business and operational decisions is highly dependent on the quality of the seismic images and earth models.

The known methods of analyzing the quality of the 3D seismic survey are flawed in some respects. Normally, bin fold maps are created, spider diagrams of the azimuth distributions are pulled and/or the partial fold of stack plots on the survey design are reviewed to obtain information regarding the overall potential for the quality of the survey. While these techniques relate information about the survey as a whole and attributes drawn from them are indicative of the quality of the survey, these techniques do not analyze the sampling of the survey or compared it to other surveys or take into account the possible variations in actual field implementation of the theoretic survey. Other techniques involve visual inspection of time slices through the fold and offset planes of proposed designs. However, the interpretation is influenced by a users experience and knowledge, and thus is somewhat subjective and not easily compared between users.

There exists a need for a more robust technique for analyzing the quality of a 3D seismic survey, preferably one that is not as subjective.

SUMMARY

Novel methods for analyzing the sampling quality of a 3D seismic survey are described. The methods allow for improving a given survey and for comparing different survey designs to improve the quality of the final survey. Thus, the presently disclosed methods address the shortcoming of the known methods of analyzing the quality of the 3D seismic survey.

In one embodiment of the novel methods is the use of a common mid point (CMP) array formed from the survey and analyzed to remove nodes and/or artifacts indicative of excessive sampling or no sampling. In a second embodiment, the entire survey is treated as if it were a single set of sources and a single set of receivers and one were doing an array study to understand the geophone and source array interactions. For both embodiments, different proposed survey designs can then be compared to determine the potential sampling quality of the final survey.

The common mid point (CMP) method of recording is a universally accepted method in the industry. In CMP recording, waves of seismic energy from the source point are reflected to the receiver from a point located midway from the shot and receiver. For 3-D surveys, gathers are constructed by taking all seismic traces from an area, referred to as a "bin", around each common midpoint and assigning the traces to that common midpoint. The areal dimensions of the bin are generally half the group interval by half the source interval.

One embodiment of the present methods is to take the source and receiver locations and then sum the responses, offsets, and azimuth relationships in the CMP space to form a "CMP array". This CMP array then undergoes frequency-wavenumber (F-K) filtering and the resulting spectrum is analyzed for stacked nodes or sampling artifacts where there is either excessive sampling or no sampling. These nodes and artifacts are minimized to maximize the quality of the survey. This is called the "CMP method" herein.

With the CMP method, once the bin-by-bin CMP data is F-K transformed, it can be interactively analyzed looking for regions that show non-uniformity of sampling or other artifacts. The data could be filtered by wavenumber to accentuate anomalies, which would then be addressed in the geographic coordinate space of the source and receivers. The process would then be iterated so that variability from bin-to-bin is minimized and an optimal survey is designed.

An alternative embodiment is to treat the complete survey as if it were a single set of sources and a single set of receivers and one were doing an array study to understand the geophone and source array interactions. This is called the "Total Survey" method herein. As an example, instead of a commonly used 12-geophone linear array, one could input in a for example a 32,000 point full survey receiver location file as an "array" into the geophone array analysis program. At the same time one could input a box array of 4 vibrators, thus, one would put in for example all 40,000 source point locations from the whole survey as if it were just a single source point "array".

The program next would F-K transform the two-dimensional set of receiver and source locations just as if it were a test array for array studies. This way, instead of studying a single source and receiver location like one would normally do, we treat the complete survey as a single source and receiver point and study the whole survey at once.

In the Total Survey method, the typical approach analyzes the whole survey at once by taking the source locations for the full survey and F-K transforming them. The process is repeated for the receivers for the full survey. The two F-K transform spectra (source and receiver) are considered for errors in sampling and biases that should/could be corrected in the geographical space. The two transforms can be combined and then the total survey CMP space can be analyzed for errors or biases, corrected, and the process repeated for alternative survey designs or changes in source and receiver locations in the current design. This approach treats the whole survey as a single entity for analysis and study of biases.

Both methods include optional steps of quantitatively comparing the filtered spectrum for two or more survey designs to analyze the quality of the different designs. This will help a user determine if and how to move source and/or receiver points or change the design to optimize the data collection and subsequent analysis.

These embodiments are quite different from the current methodology, which uses stack array concepts where one inputs the field arrays and convolves them with the source and receiver locations because that shows the effect at each bin. The currently described methods look at the whole survey at once, in contrast, allowing comparison and analysis for spatial sampling bias and errors that heretofore had never been seen or addressed.

In either of the methods, problem areas would be located necessitating a review of the actual pre-plot or as-surveyed locations of the source and receivers to find a better location and then move the sources, receivers or both to better locations that would reduce whole survey biases instead of focusing on local issues. These problem areas are normally due to obstacles, such as lakes, rivers, no-permit regions, or other limits to full access by the seismic crew. The proposed new locations would be re-inputted into the analysis package as described above and the results compared to see if the new locations improved or degraded the biases observed. This is repeated as necessary until an optimal solution is found.

In either method, the transformed data will be considered for wavenumber and directional biases of the arrays in 2D and 3D representations of the F-K transformed data. Either approach can use conventional geophone array analysis software to display the data in survey design packages for ease of study and interactive filtering.

In another embodiment of the present methods, the source point locations for a proposed or a previously acquired survey are entered into the design software as a source array. The location of the receiver points are also entered as a separate receiver array. The arrays are then transformed using the F-K transform and studied and compared. Both the bin-by-bin CMP array and the Total Survey arrays are then reviewed for spectral artifacts separately and in a combined mode to see the full effect of the whole survey. Any artifact found can then be used to help in the design of a new survey and the old survey and the new proposed survey can be easily compared and displayed. The proposed survey design can be tuned to improve the quality of the survey by moving the geographic source and/or received locations. Once the quality and design are acceptable, then seismic data can be acquired (or re-acquired if a problem is found in a previously executed survey).

One advantage of the present methods is the ability to analyze the impact of the offsets, obstacles, and other aspects of the survey to determine the potential sampling quality. The problem with more conventional approaches like fold, spider plots or triangle plots is their focus on bin attributes and not the overall actual surface sampling that leads to spatial aliasing.

A good example of where the present methods improve the survey design is in regard to a sharp inside corner in the survey. Bin attributes with sharp corners are fine and acceptable with nearly the same bin sampling as other areas on the edge of the survey. But, sharp inside corners create migration problems, just as a diffractor does, although the problem shows up as disruptions spatially instead of in the plane of the seismic data. The solution to the sharp inside corner is more rounded corners of the survey that do not disrupt the sampling as much. The inventive methods can identify these areas and problems in the survey, allowing their correction before proceeding with expensive data acquisition.

The ability to compare multiple designs and/or previous surveys will improve the final survey. Further, the methods will decrease the possibility of surface sampling related acquisition footprints. This in turn results in design surveys that are amendable to compressive sensing methods or techniques.

The data needed for the present methods are the geographical location of the source and receivers and the acquisition geometry for each shot that contributes to the CMP point that lands in that bin. If one works in geographic space, sometimes the software is not aware enough of the general DC offset in x and y of the survey so the F-K transform is offscale. In this case, it is easy to subtract off the x and y location of the center point of the survey so that loaded geographic data is centered on the origin of the graph. At this point, it is easily transformed over as an F-K representation of the survey in both source and receiver for further study if using the Total Survey method, or a recursive F-K transform of each shot for each bin in the CMP method and the data can then summed and presented in the array analysis software.

In more detail, the responses are presented as small glyphs or graphs showing the power spectrum, ball type F-K plots or full miniature F-K 3D spectra (see e.g. upper left display in FIG. 3). The method of presentation is somewhat dependent upon the software chosen, but the end goal is the same. A user is looking for zones of localized variability from the main survey in the CMP method or localized nodes of non-uniformity in the Total Survey method.

The F-K filter is preferably a post transform real time interactive filter that allows a user to adjust the frequency response of the filter and see the effect on the different regions at the same time. These are commonly available filters in commercial geophysical array design packages.

Any seismic survey software or add-in can be used with the present methods including Omni 3D (Schlumberger), Mesa (Ion Geophysical) and Echos (Paradigm). However, Omni 3D with the seismic survey design package is the preferred software because it can handle the large number of points easily in the 64 bit version of the package. This is especially important as conventional array design rarely uses over 288 geophones and rarely uses over 64 source locations. When loading a whole surveying data set in as a single geophone or source location, a user might be inputting tens of thousands of points at once into the program.

Non-geophysical packages like Mathematica (Wolfram Research) or Matlab (Mathworks) can also be used. However, the inventors have found that the translation step from each iteration of adjustment to the resulting F-K representation of the whole survey for these packages can make the process less efficient. Nonetheless, they are functional in the herein described methods.

Any seismic survey design can be analyzed and compared in the present methods. Commonly survey geometries are the parallel, orthogonal, and areal geometry. However, brick-wall geometry (source lines and receiver lines form a brick-wall pattern), slanted geometry (source lines non-orthogonal to receiver lines) and zigzag geometry (two families of source lines making angles of 45° and 135° with the receiver lines) can also be compared. The different geometries can be compared to determine which design offers the best sampling quality for a particular reservoir. Alternative, the positioning of the sources and receivers can be modified to minimize the appearance of artifacts while still maintaining the geometry. Further, the seismic sources and receivers can be nominally (or about) perpendicular or parallel. An exact right angle is not necessary as slightly non-perpendicular (or non-parallel) geometries also work.

This summary is provided to introduce a selection of concepts that are further described below in the detailed description. This summary is not intended to identify key or essential features of the claimed subject matter, nor is it intended to be used as an aid in limiting the scope of the claimed subject matter.

The distance between adjacent source points along a seismic line is the "source-station spacing." The distance between adjacent receiver points along a seismic line is the "receiver-station spacing." Spacing normally determines bin size.

As used herein "CMP array" is constructed by taking all of the source and receiver pairs associated with every CMP point that lands in a particular bin, and treating them as if they were a source and receiver array. These constructed arrays are then analyzed on a bin-by-bin basis for artifacts.

As used herein "stacking bins" refer to a grid of small, abutted subareas that the 3D seismic image is divided into once data is collected and processed. Each trace in a 3D seismic data volume is positioned so that it passes vertically through the midpoint of a stacking bin. Stacking bins can be square or rectangular, as preferred. Generally, the dimension of a 3D stacking bin in the direction in which receiver lines are deployed in a 3D grid is one-half the receiver-station spacing along these receiver lines, and the dimension of the stacking bin in the direction in which source lines are oriented is one-half the source-station spacing along the source lines.

The "CMP spacing" is half of the receiver interval. The fold of the CMP (NCMP) is given by the receiver spread length (=number of receivers NG times receiver interval $\Delta \times G$) and the shot interval $\Delta \times S$:

$$NCMP = NG \times \Delta \times G / (2\Delta \times S)$$

As used herein, a "fold" is a measure of the redundancy of common midpoint seismic data, equal to the number of offset receivers that record a given data point or in a given bin and are added during stacking to produce a single trace. Typical values of fold for modern seismic data range from 60 to 2400 for 2D seismic data, and 10 to 1200 for 3D seismic data.

As used herein, "stacking" is the process of summing together the traces so that the coherent primary signal is enhanced by in-phase addition, while source-generated and ambient noise is attenuated by destructive interference.

As used herein, "DC offset" is a mean amplitude displacement from zero. In audacity it can be seen as an offset of the recorded waveform away from the center zero point. DC offset is a potential source of clicks, distortion and loss of audio volume.

As used herein, a seismic "artifact" is any distortion in the seismic data that can impede the ability to accurately estimate reservoir properties of interest from seismic data.

The term "quality of the coverage" as used herein is intended to mean the quantitative quality of an attribute of the data associated with particular portions, such as bins, of the area of a seismic survey.

The term "acquisition footprint" is used to describe amplitude stripes that appear in time slices or horizon slices produced from 3-D seismic data volumes.

As used herein, an "offset" refers to the distance from the source point to a geophone or to the center of a geophone group.

"Normal moveout" or "NMO" refers to effect of the separation between receiver and source on the arrival time of a reflection that does not dip. A reflection typically arrives first at the receiver nearest the source. The offset between the source and other receivers induces a delay in the arrival time of a reflection from a horizontal surface at depth.

As used herein, "azimuth" refers to a post-stack attribute that computes, for each trace, the azimuth between the source point and the receiver point that forms that CMP trace. It is measured in degrees from north normally and varies form 0 to 360 although some look at the displays as plus and minus 180 degrees.

As used herein, "node" refers to a single recording station. A "stacked node" refers to group of recording stations at one location.

As used herein, an "F-K filter" or "F-K transform" refers to a two-dimensional Fourier transform over time and space, where F is the frequency (Fourier transform over time) and K refers to wave-number (Fourier transform over space). The space dimension is controlled by the trace spacing and (just like when sampling a time series) must be sampled according to the Nyquist criterion to avoid spatial aliasing. The F-K filter is any sort of filter applied to the transformed data in the transformed F-K space. The F-K transform is the algorithm applied to the data that actually converts the X-Y conventional sample data into F-K space for analysis.

As used herein, "sampling" is needed because the use of digital computer technology means that the analogue signal must be sampled at regular intervals in time in order to be processed. Any signal would be perfectly represented in the computer if an infinite number of samples were taken, however, this is impractical. If an insufficient number of samples are taken, the higher frequency information is "lost" or "aliased." The highest frequency f that can be sampled by interval d is ½d—this is called the "Nyquist Frequency." Higher frequencies than this are said to be temporally aliased because they will appear as if they are lower frequencies. If either temporally or spatially aliased data are admitted into further processing stages, then artifacts and noise may well be introduced which could potentially be misleading. An understanding of sampling (particularly spatial sampling) is an important part of survey design and can affect survey costs and quality. It is obviously important to sample signals correctly, but it is equally vital to adequately sample noise if this is to be removed by processing routines.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| CMP | Common mid point |
| F-K filter | Frequency-wavenumber filter |
| NMO | Normal Moveout |

DESCRIPTION OF EMBODIMENTS OF THE DISCLOSURE

Figure 1:
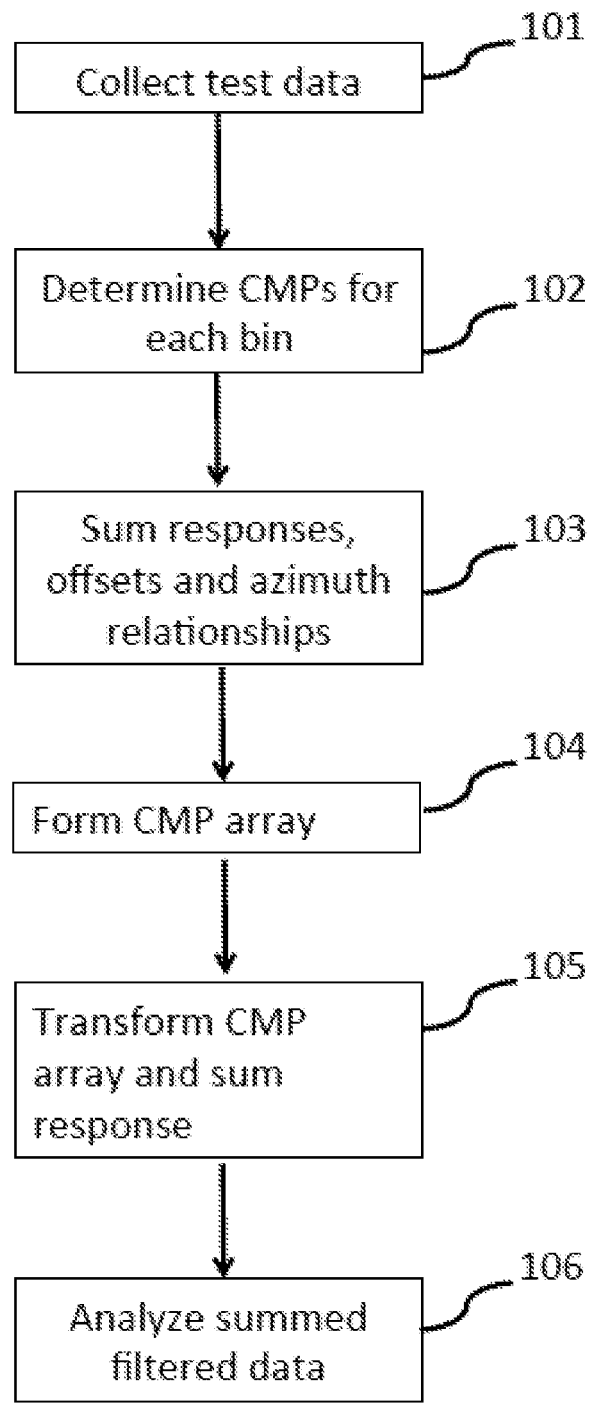
FIG. 1. Schematic of method according to the CMP array embodiment.

The disclosure provides a novel method of analyzing a 3D seismic survey and predicting quality of survey and, optionally, means of improving the quality by adjusting survey design parameters.

The present methods include any of the following embodiments in any combination(s) of one or more thereof:

A method of evaluating or optimizing a seismic survey design comprising, determining the location of a plurality of seismic sources and a plurality of receivers geographically in a seismic survey design; summing the responses, offsets, and azimuth relationships for the locations determined in the first step in the central midpoint space (CMP); compiling said summed responses, offsets and azimuth relationships into a CMP array; applying an F-K transform to said CMP array; applying a frequency-wavenumber filter to said transformed CMP array; evaluating the filtered array for artifacts; modifying said survey design to correct said artifacts; and repeating steps a-f until an optimal survey is produced, and applying said optimal seismic survey design to a reservoir.

A method of creating or optimizing a seismic survey design for a hydrocarbon-containing reservoir, comprising: determining the location of a plurality of seismic sources and a plurality of receivers in one or more proposed seismic survey designs for a reservoir being developed; summing the responses, offsets, and azimuth relationships for the locations determined in step a in the central midpoint space (CMP) for each proposed seismic survey design; compiling said summed responses, offsets and azimuth relationships into a CMP array for proposed seismic survey design; applying a frequency-wavenumber filter to said CMP array for each proposed seismic survey design; comparing the filtered array for artifacts in each proposed seismic survey design; selecting the proposed seismic survey design with the minimal artifacts; and applying said selected seismic survey design to said reservoir.

A method of evaluating a seismic survey design comprising, determining the location of a plurality of seismic sources and a plurality of receivers geographically in a seismic survey design; inputting the complete set of sources into an array design software to form a sources array; inputting the complete set of receivers into said array design software to form a receivers array; applying an F-K transform to said sources array and said receivers array; applying interactive frequency-wavenumber filters to said sources array and said receivers array; combining filtered sources array and receivers array; evaluating the source array, receiver array and the combined filtered array for artifacts; modifying said survey design to correct said artifacts and repeating steps a-h until an optimal survey is produced; and applying said optimal seismic survey design to a reservoir.

A non-transitory machine-readable storage medium, which when executed by at least one processor of a computer, performs the steps of any method herein described.

Any method as herein described, further comprising the step of changing one or more locations of one or more seismic sources or receivers or both to minimize artifacts.

Any method as herein described, further comprising comparing artifacts for two or more survey designs.

Any method as herein described, wherein said plurality of seismic sources or said plurality of receivers or both are about perpendicular, or about parallel, or both, e.g., orthogonal, but they can also be non-orthogonal.

One embodiment of the present disclosure is exemplified with respect to the description below and FIG. 1. However, this is exemplary only of the "CMP method". The following is intended to be illustrative only, and not unduly limit the scope of the appended claims.

A schematic of the basic steps taken in the described CMP method is shown in FIG. 1. First, test seismic data 101 is collected for a proposed seismic survey design. The source and receiver locations are combined with the acquisition template to determine the CMP's for each bin 102 and then used to determine the responses, offsets, and azimuth relationships in the test data. These relationships are then summed 103 in the CMP space to form a CMP array 104.

The CMP array then undergoes transformation using a F-K filter algorithm 105 and the responses summed. The summed responses are then interactively filtered and analyzed as if it were a geophone array using geophone array design software to bring out artifacts and other sampling issues in the data 106. The F-K domain will show the artifacts clearly whereas in the spatial or geographic domain it is more difficult to spot by eye.

The user can then clean up the artifacts by moving the locations of the source and or receivers geographically to new or better points and thus, improve the quality of the data. Regions containing artifacts are commonly associated with survey edges, obstacles like railroads, lakes and no permit regions or similar real world encumbrances that naturally degrade the preferred sampling of the survey.

In addition to analyzing a single survey for artifacts, two or more survey designs can be compared to analyze the quality of the different designs. Aspects from each design can then be implemented into the final design. This correction process and then re-collection of the CMP array and retransforming with analysis can be repeated until the survey is optimized. Once the final optimized design is created, data can be collected according to known methods in the art.

Figure 2:
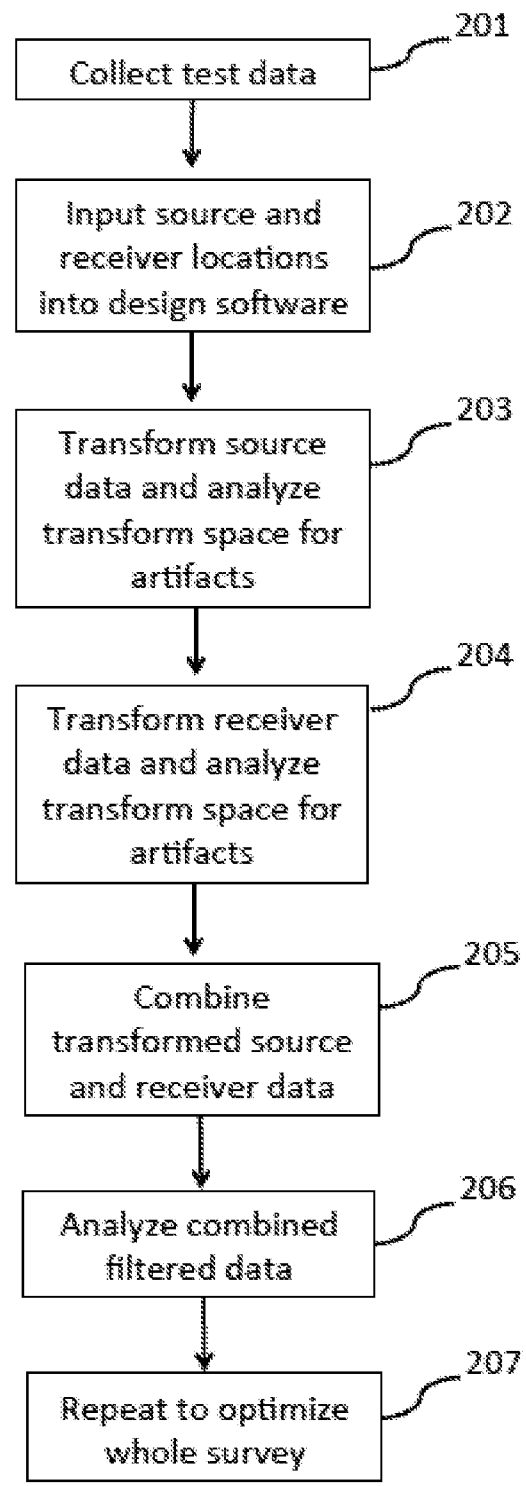
FIG. 2. Schematic of method according to the Total Survey array embodiment.

In a second embodiment, shown in FIG. 2, the "Total Survey" method, the approach is similar. Test data is collected and the source and receiver locations for the whole survey are input into a geophone array design software package 202. The survey sources are then F-K transformed and analyzed in F-K space for patterns and sampling artifacts 203. The same approach is used on the receivers 204. Once each subgroup is handled, the two F-K spectrums are combined in the geophone array analysis software 205 and the combined spectrums are analyzed again for anomalies in sampling and inconsistencies in the whole survey 206. These are iteratively corrected and then the process repeated until the whole survey is optimized 207.

Results from using the Total Survey method are shown in FIGS. 3-6 using exemplary data representing an obstacle encountered during a Barnett 3D seismic survey near Denton, Texas in 2012. The obstacle was a no permit zone next to a lake and this example recreates how the problem was addressed, while not using the actual survey data. The example data was loaded into the Omni 3D seismic survey design package for this example.

Figure 3:
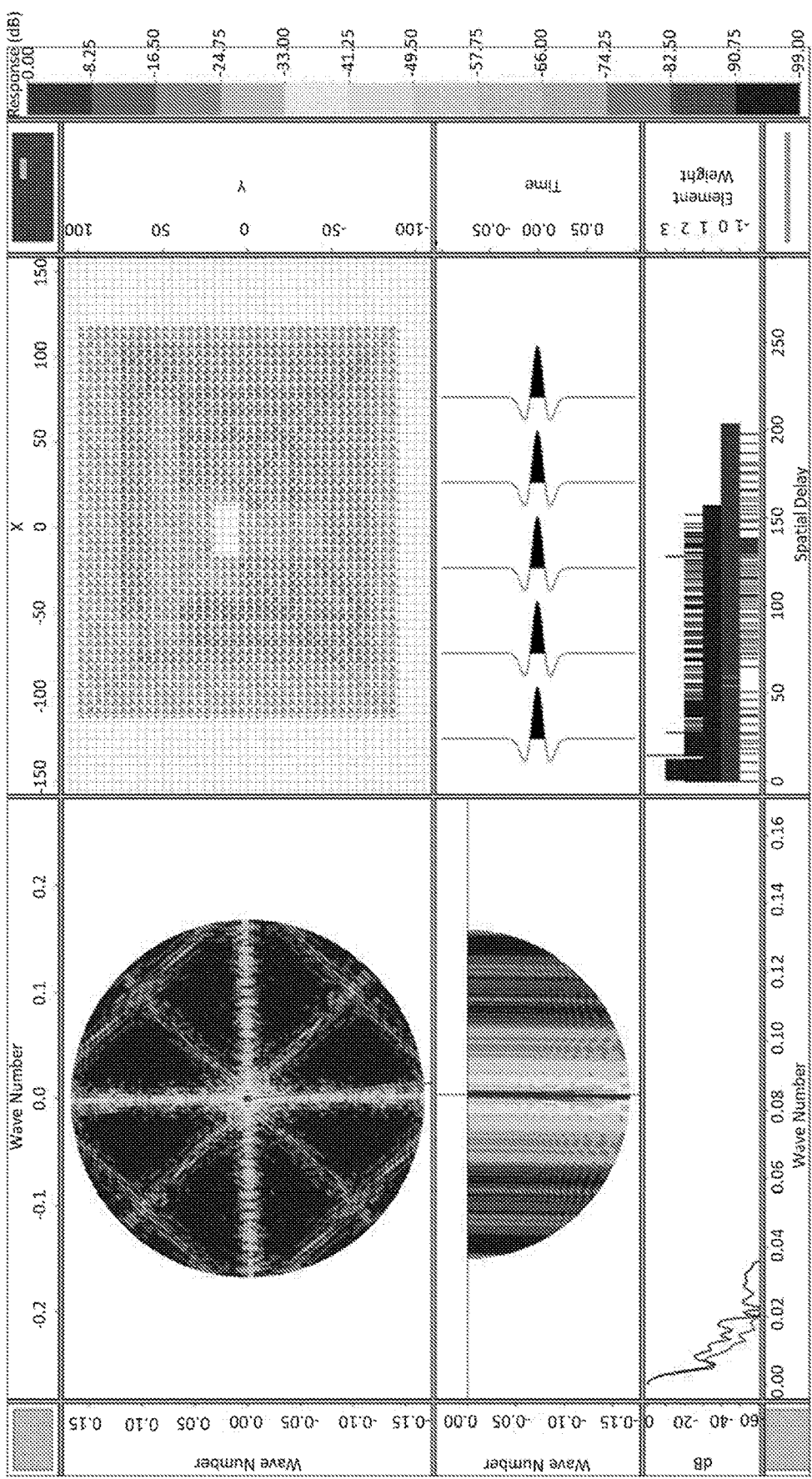
FIG. 3. Exemplary graphic of step one of the Total Survey array embodiment displaying synthetic data and a grid of shots and receivers before any artifact correction or optimization. The F-K transformed and filtered data is shown on the left in a plan view (top) and cross section view (bottom). The actual layout is shown in the upper right.

FIG. 3 displays an example graphic of source and receivers positions, per step 202 of FIG. 2. This organization of display is exemplarily only and a user will be able to modify it for his needs. In this particular layout, the figures are, starting from upper left and moving clockwise, the power spectrum or F-K spectrum in plan view, the sources and receivers locations and weights with the average actual geographic location removed, the derived exemplary wavelet from the convolution of the sources and receivers (middle right), the element weights of the array along the line of analysis (bottom right), the decibel (dB) power spectrum for the composited array (bottom left) and a cross section view of the F-K spectrum (middle left).

In FIG. 3, we have mapped a grid of shots and receivers laid out with some duplication and some gaps that are caused by no permit region and a lake of the target area in center of the upper right corner of the display. The plot in the upper left corner is the combined signature of source and receiver data. The roughness in this plot is clearly visible. There is a strong grain in both the north-south and east west direction, but that is due to the grid nature. There are also wings and the 45° diagonals caused by the sharp corners caused by the gaps in permit regions.

Figure 4A:
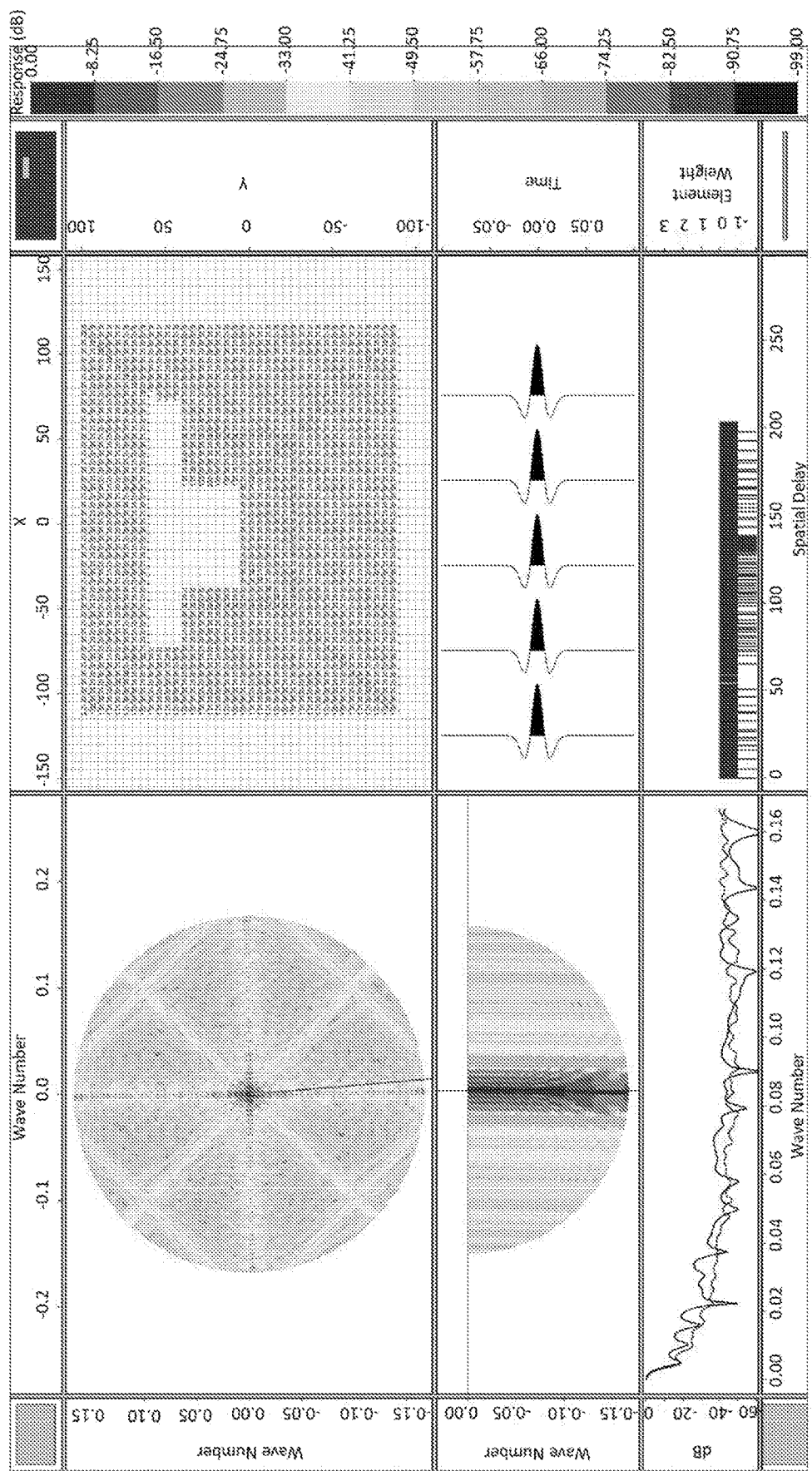
FIG. 4A. Display of the impact of the Total Survey array on the sources only at step 1 before any artifact correction or optimization.
Figure 4B:
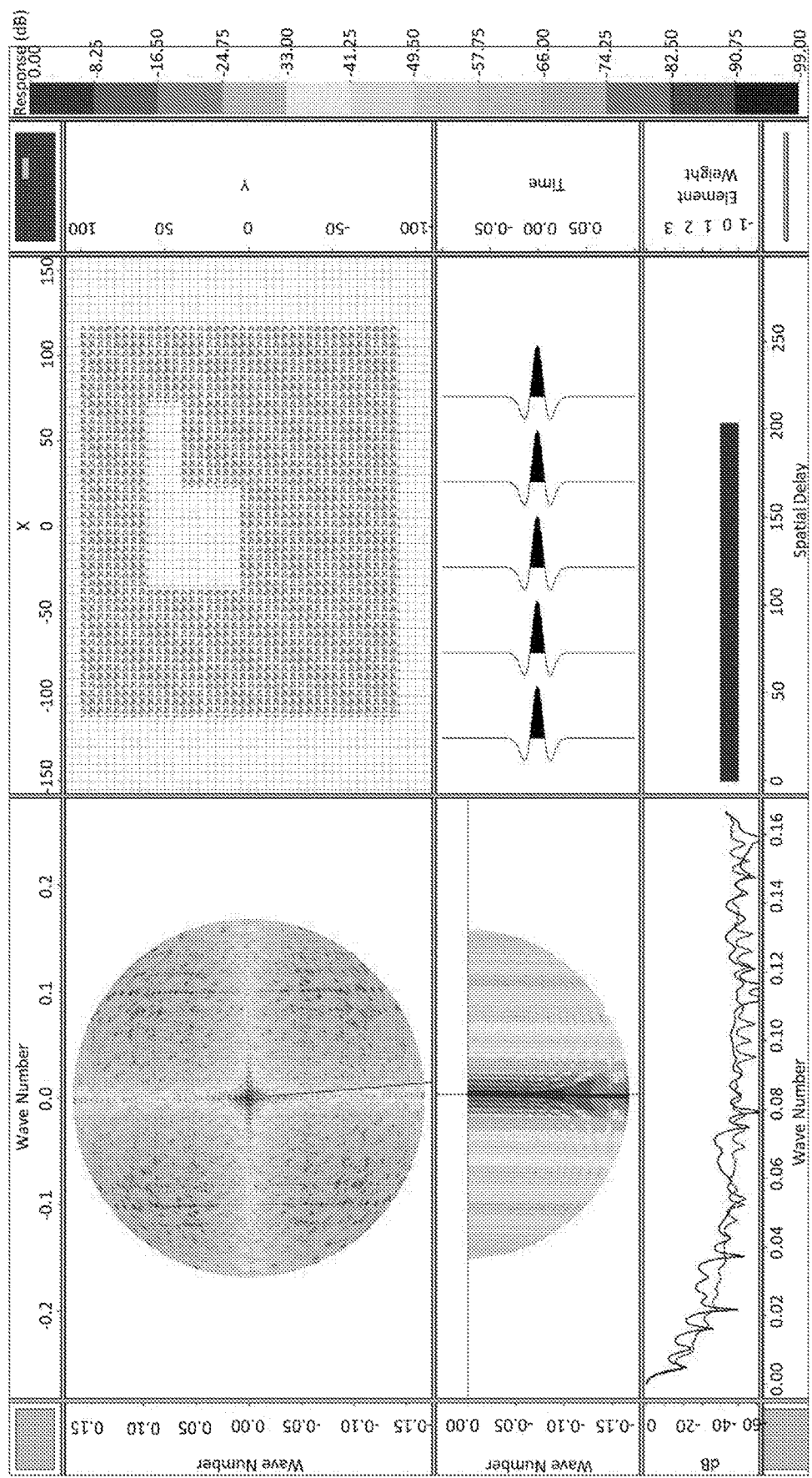
FIG. 4B. Display of the sources in FIG. 4A after the first pass of cleanup of artifacts.
Figure 4C:
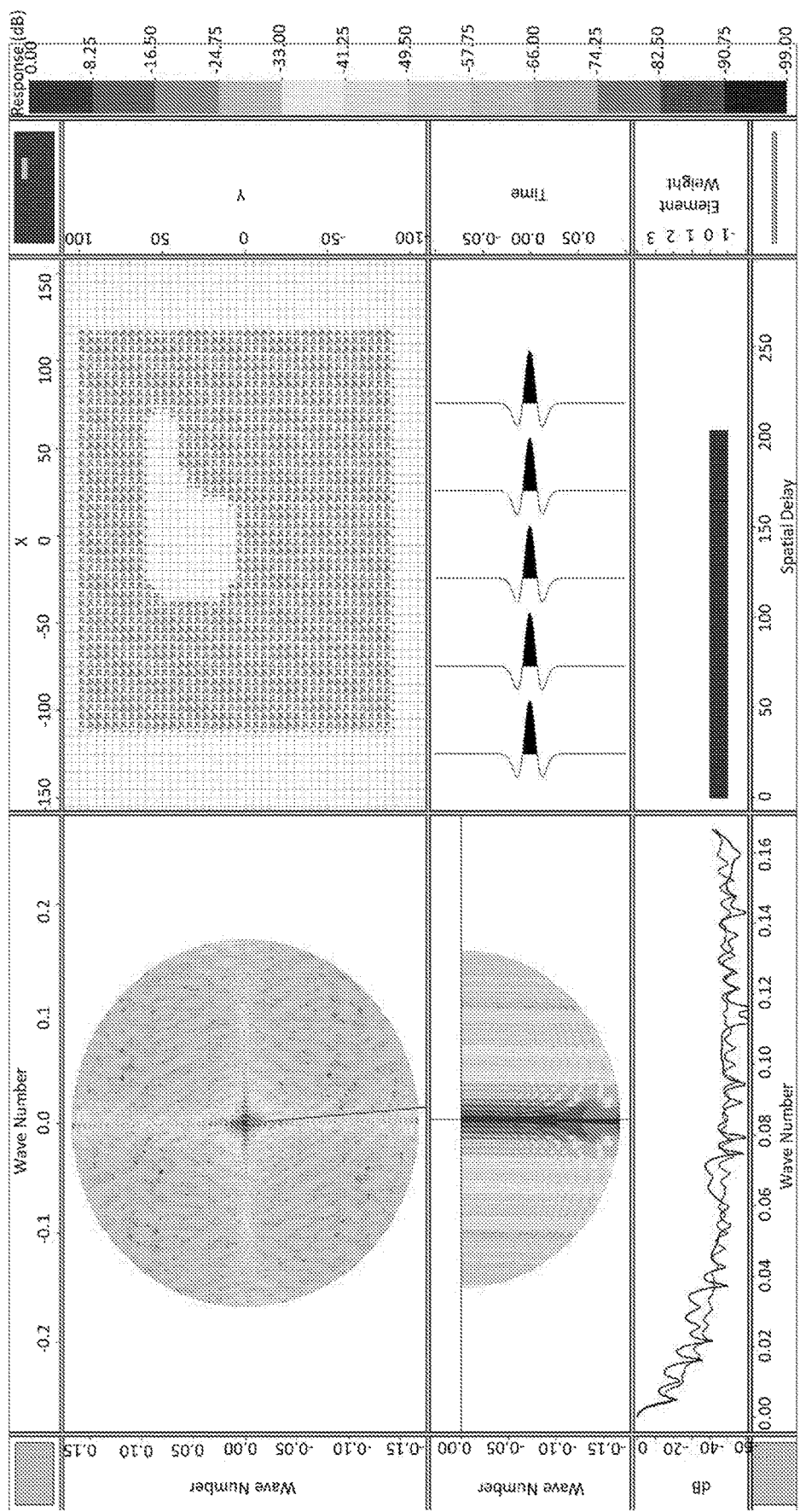
FIG. 4C. Display of the sources in FIG. 4B after a second cleanup using the F-K transformation to optimize the spectrum. Compare the impact of rounding the edges of the lake in the center of the survey to the to FIG. 4A in left FK filtered displays.

In the Total Survey Method, step 203 of FIG. 2, requires a user to first transform the source data and analyze transform space for artifacts. FIG. 4A-C displays the source data before (4A), after a first transformation (4B) and a final, cleaned up source display (4C). In this example (and in the real project) we did not actually move points from the pre-plotted position. What was done instead, was determine through the inventive method, which positions were critical to obtain and we then worked with the land-owner and seismic crew to obtain access to these positions and actually acquire some data in the lake during a dry period when access became available.

FIG. 4A displays the original source data before any processing. The light colored t-shape in the upper right spectrum is due to an area without sources because of e.g. lack of permits, rivers, lakes, etc. The sharp inner edges are problematic because they act as diffractors of the signal. Thus, the optimization of the design will focus on smoothing these corners. The smoother the corners, the less disruption in signaling and the more cost effectiveness of the acquisition. While most who are skilled at the art recognize that smoother boundaries are probably a better approach then sharp corners, there has not been any easy way prior to the inventive method to parameterize or quantify the improvements or impact of changes in the survey design.

After processing with the first F-K transformation, the FK spectrum in the upper left corner has significant changes. FIG. 4B appears to be the best we can do with the sources and the area we can scan. Sometimes a user just cannot get the permit for the entire plot of land (or in this case the lake was too deep to source) so there is a hole in the upper right plot. By rounding the edges off of the hole, but not running another transform, we were able to clean up the dark vertical lines internally in the upper left plot to achieve the display in FIG. 4C.

Figure 5A:
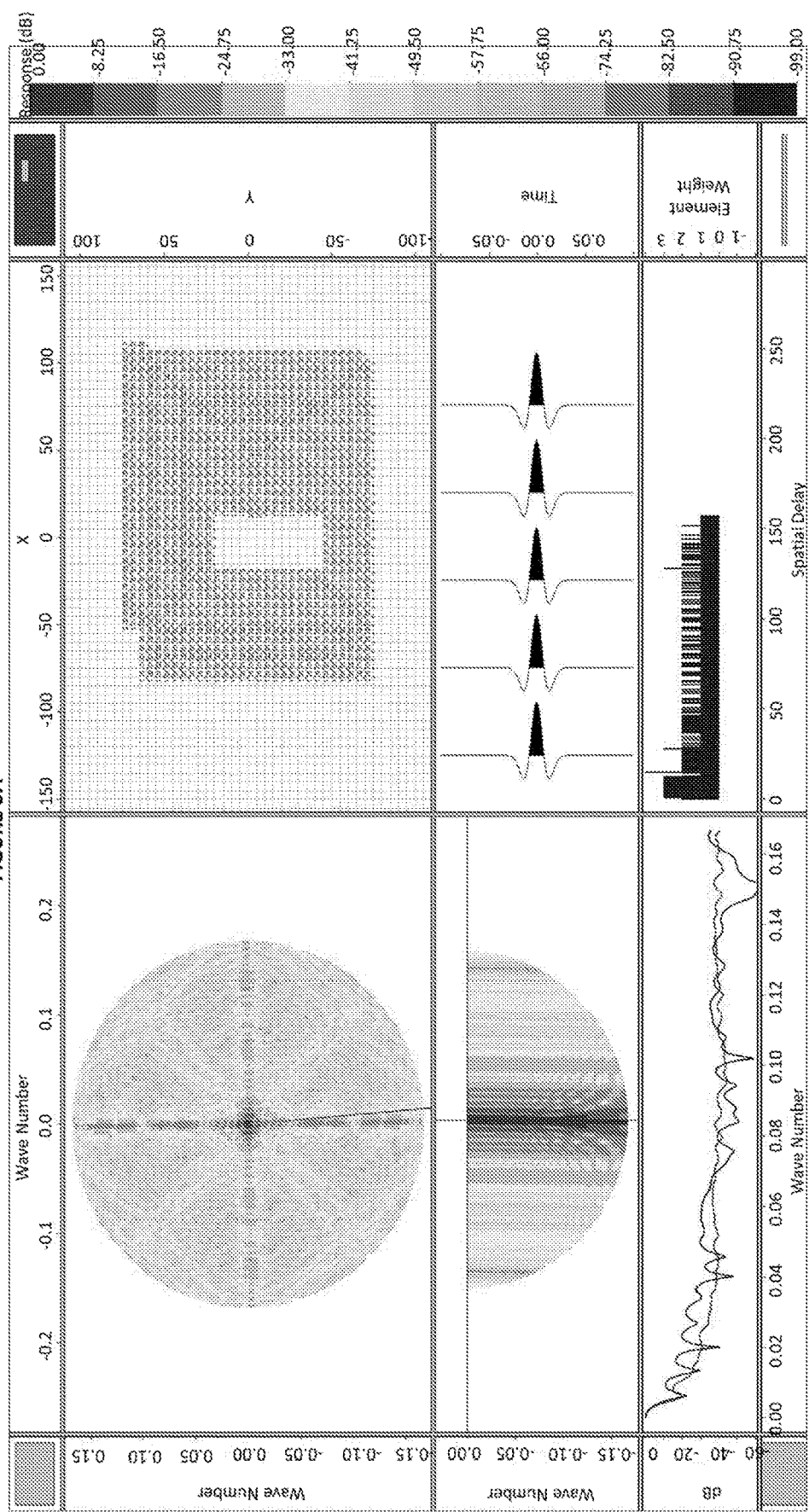
FIG. 5A. Display of the receivers at step 1 before any optimization or artifact correction. Note the variability in the FK plan view display in the upper left panel.
Figure 5B:
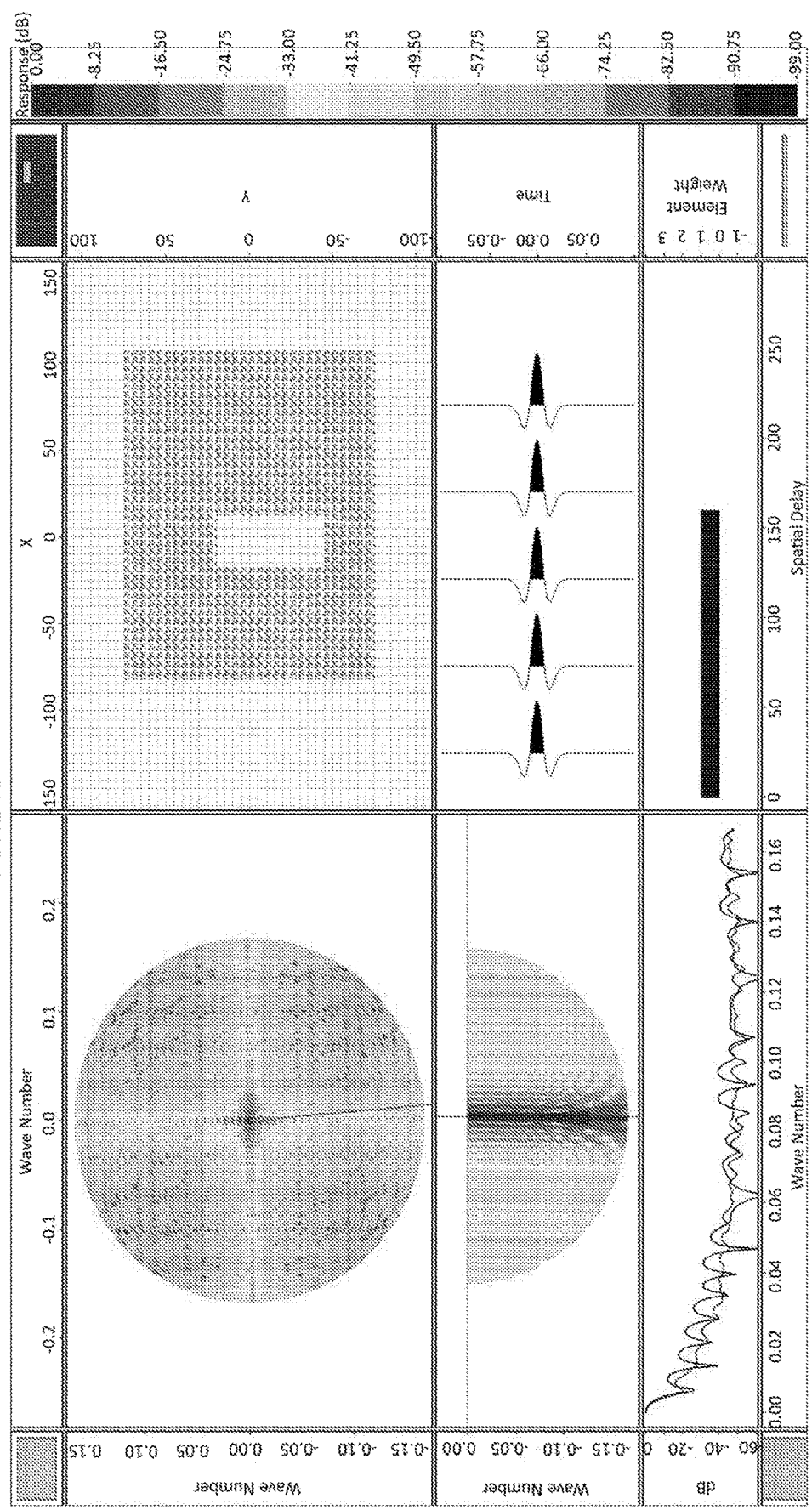
FIG. 5B. Display of the sources in FIG. 5A after the first round of cleanup of artifacts.
Figure 5C:
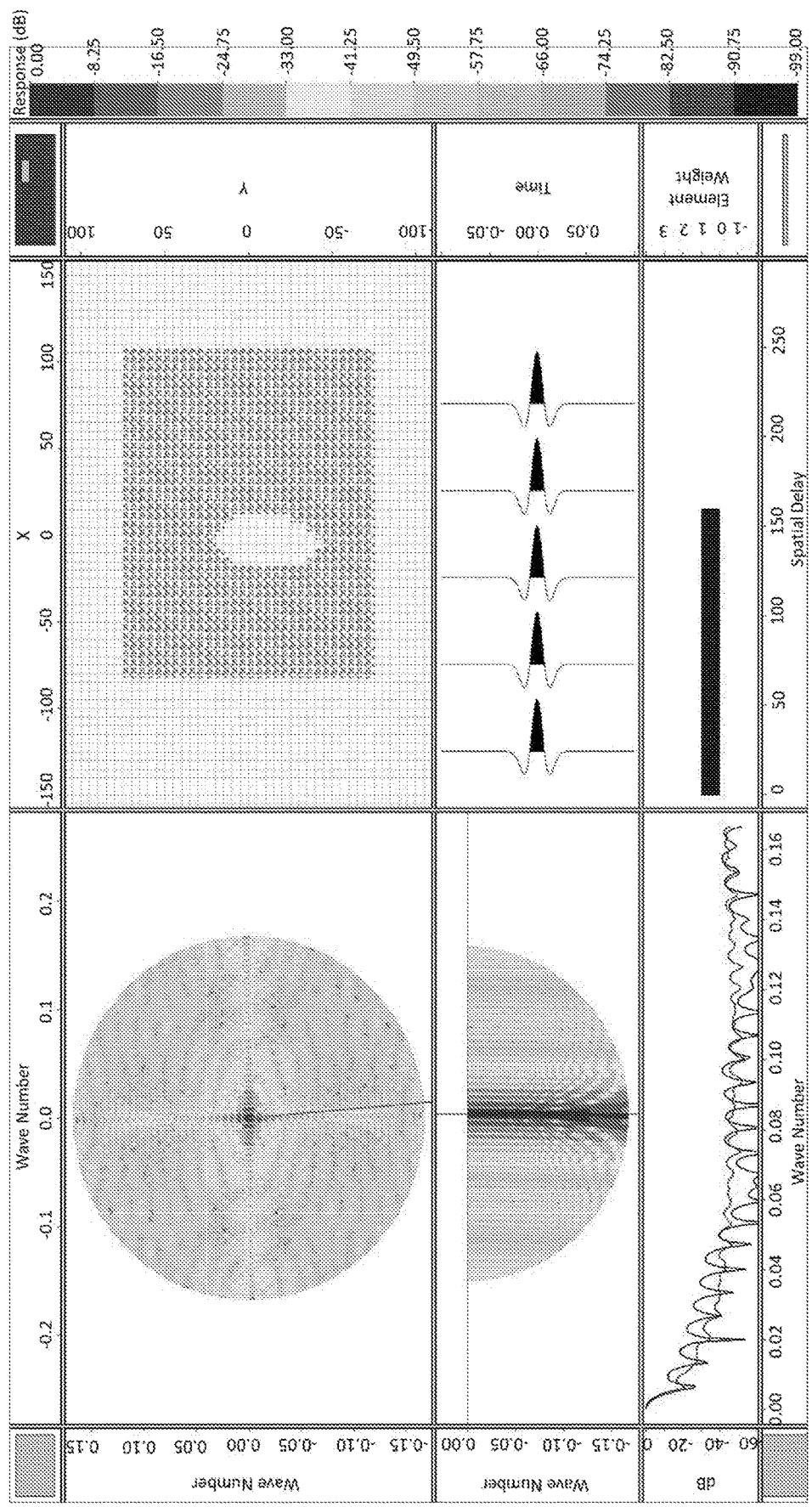
FIG. 5C. Display of the receivers in FIG. 5A after a second (final) round of cleanup using the F-K transformation. Compare the impact of rounding the edges of the lake in the center of the survey to FIG. 5A in left FK filtered displays.

The next step, step 204, is to analyze just the receivers. The display for the receivers is shown in FIG. 5A-C. In the upper left spectrum of FIG. 5A, the dark lines intersecting in the middle of the spectrum are from the sharp corners caused by the no permit zone.

After the first round of transformation, shown in FIG. 5B, the intensity of the dark lines have been reduced. FIG. 5C shows the results after a second transformation where the artifacts were further attenuated by working with the seismic crew to obtain some receiver locations in the lake area are effectively rounding the edges of the hole. FIG. 5C is the final receiver cleanup. Again, sometimes a no permit zone or lake or river cannot be fixed and a hole in the upper right spectrum remains. This second transformation made the spectrum as clear as possible and rounded the sharp edges.

Figure 6:
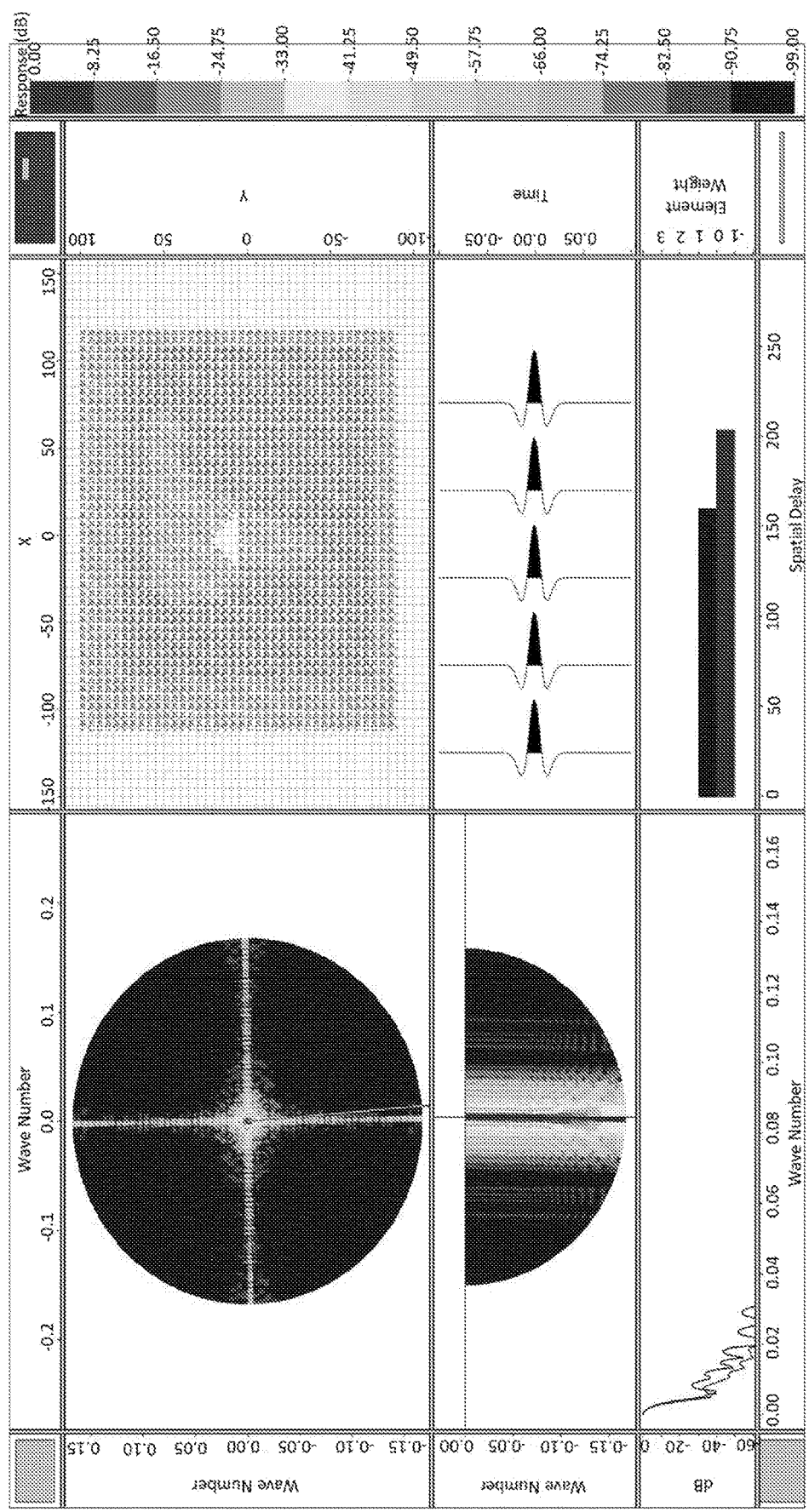
FIG. 6. Exemplary graphic of the grid of shots and receivers in FIG. 3 after undergoing optimization by the Total Survey method.

FIG. 6 demonstrates the final combined results from the fixed source and receiver data. There is a strong grain in both the north-south and east west direction, but that is due to the grid nature of the sources and receivers. If we had not shot on cardinal orientation (NS-EW) the grain would be oriented in a different direction. The Total survey method did address the wings and the 45° diagonals caused by the sharp corners shown in FIG. 3 and was able to smooth them out and reduce the disruption to signal.

This process can be applied over and over to improve and clean up the overall FK spectrum in the upper left corner of FIG. 3-5, until the survey is optimally designed. The final layout of the sources and receivers can the be performed in the field according to the optimized survey design. Because the no permit areas and means to reduce the artifacts are known in advance, both time and money can be saved using the optimized survey design.

Hardware for implementing the inventive methods may preferably include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system.

Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors.

Slower systems could be used but are less preferred since seismic data processing may already compute intensive.

The results may be displayed in any suitable manner, including printouts, holographic projections, display on a monitor and the like. Alternatively, the results may be recorded to memory for use with other programs, e.g., reservoir modeling, and the like.

The following references are incorporated by reference in their entirety: U.S. Pat. No. 7,660,674.

What is claimed is:

1. A system comprising:
   a plurality of seismic receivers disposed in a survey area at a plurality of receiver locations; and
   a plurality of seismic sources disposed in the survey area at a plurality of source locations, the plurality of receiver locations and the plurality of source locations specified by a seismic survey design minimizing any artifacts identified in a filtered spectrum obtained by applying a frequency-wavenumber filter to a central midpoint space summation, the plurality of receiver locations and the plurality of source locations are determined based on a comparison of the filtered spectrum to a second filtered spectrum, the second filtered spectrum being for a second central midpoint space summation.

2. The system of claim 1, wherein the artifacts are iteratively corrected in optimizing the seismic survey design.

3. The system of claim 1, wherein the seismic survey design is selected from a plurality of seismic survey designs.

4. The system of claim 1, wherein the seismic survey design corresponds to at least a portion of the survey area.

5. The system of claim 1, wherein the central midpoint space summation is generated based on responses, offsets, and azimuth relationships summed in a central midpoint space for the plurality of source locations and the plurality of receiver locations.

6. A system comprising:
   a plurality of seismic receivers disposed at a plurality of receiver locations of a seismic survey; and
   a plurality of seismic sources disposed at a plurality of source locations of the seismic survey, the plurality of receiver locations and the plurality of source locations being determined by:
      generating a source array based on the plurality of source locations of a seismic survey design for the seismic survey;
      generating a receiver array based on the plurality of receiver locations of the seismic survey design;
      generating a filtered source array by applying a frequency-wavenumber filter to the source array;

generating a filtered receiver array by applying a frequency-wavenumber filter to the receiver array;
generating a combined filtered array by combining the filtered receiver array and the filtered source array; and
identifying any artifacts in the combined filtered array, the seismic survey design minimizing the artifacts.

7. The system of claim 6, wherein the artifacts are iteratively corrected.

8. The system of claim 6, wherein the seismic survey design is selected from a plurality of seismic survey designs.

9. The system of claim 6, wherein the seismic survey design corresponds to at least a portion of a survey area of the seismic survey.

10. A method comprising:
obtaining a seismic survey design for a survey area;
generating a central midpoint space summation for the seismic survey design based on at least one of responses, offsets, or azimuth relationships summed in a central midpoint space for one or more source locations and one or more receiver locations;
obtaining a filtered spectrum by applying a frequency-wavenumber filter to the central midpoint space summation;
identifying any artifacts in the filtered spectrum; and
optimizing the seismic survey design by determining at least one of the one or more receiver locations of one more seismic receivers or the one or more source locations of one or more seismic sources, the optimized seismic survey design minimizing the identified artifacts.

11. The method of claim 10, wherein the identified artifacts are iteratively corrected in optimizing the seismic survey design.

12. The method of claim 10, further comprising:
obtaining a second filtered spectrum for a second central midpoint space array, the at least one of the one or more receiver locations or the one or more source locations being optimized based on a comparison of the filtered spectrum to the second filtered spectrum.

13. The method of claim 10, further comprising:
obtaining a plurality of seismic survey designs, the plurality of seismic survey designs including the seismic survey design, the seismic survey design being optimized based on a selection of the seismic survey design from the plurality of seismic survey designs, the at least one of the one or more receiver locations or the one or more source locations being optimized based on the selection.

14. The method of claim 10, wherein the frequency-wavenumber filter includes a two-dimensional Fourier transform.

15. The method of claim 10, wherein the one or more receiver locations are at least one of perpendicular, non-orthogonal, or parallel relative to each other.

16. The method of claim 10, wherein the one or more source locations are at least one of perpendicular, non-orthogonal, or parallel relative to each other.

17. The method of claim 10, wherein the artifacts are associated with one or more of an edge of the survey area or obstacles.

18. The method of claim 10, wherein the survey area corresponds to one or more oil and gas wells.

19. The method of claim 10, wherein identifying any artifacts in the filtered spectrum includes identifying a sharp inside corner of the survey area.

20. The method of claim 19, wherein optimizing the seismic survey design includes correcting the sharp inside corner of the survey area by using a rounded corner.

* * * * *